United States Patent Office 3,637,890
Patented Jan. 25, 1972

3,637,890
PROCESS FOR THE PREPARATION OF OLEFINS
Brian Patrick McGrath, Chowthorne, Berkshire, and Keith Vaughan Williams, Shepperton, Middlesex, England, assignors to The British Petroleum Company Limited, London, England
No Drawing. Filed Feb. 6, 1968, Ser. No. 703,264
Claims priority, application Great Britain, Feb. 14, 1967, 6,915/67, Patent 1,159,055
Int. Cl. C07c 5/62
U.S. Cl. 260—683 D
21 Claims

ABSTRACT OF THE DISCLOSURE

Olefins are prepared by coreacting a mixture of an acyclic olefin of formula $R(R_1)C=CR_2(R_3)$ where the R substituents represent hydrogen atoms, alkyl or aryl groups, and an easily polymerisable olefin e.g. isobutene, in the presence of a catalyst prepared by heating rhenium heptoxide in a stream of carrier gas whereby it is sublimed onto alumina located downstream. The catalyst thus prepared catalyses the coreaction of the olefins without polymerising the easily polymerisable olefin to any great extent.

---

This invention relates to a process for the production of olefins.

Our U.S. Pat. No. 3,526,676 discloses and claims a process for the preparation of olefins which process comprises reacting an initial mixture of two dissimilar acyclic olefins having the formula $R(R_1)C=C(R_2)R_3$ and $R_4(R_5)C=C(R_6)R_7$ respectively, in the presence of an olefin disproportionation catalyst, the R substituents of the feed olefins representing hydrogen atoms or alkyl or aryl groups with the proviso that not more than two of the groupings $R(R_1)C<$, $R_3(R_2)C<$, $R_4(R_5)C<$ or $R_7(R_6)C<$ are the same.

A disproportionation catalyst is a catalyst which is capable of effecting the conversion of an olefin to a mixture of olefins having higher and lower carbon numbers than the feed olefin. Such catalysts include mixtures of molybdenum oxide and alumina, preferably containing cobalt oxides and optionally containing minor amounts of alkali metal or alkaline earth metal ions, molybdenum, tungsten or rhenium carbonyls supported on alumina, silica or silica/alumina, tungsten oxide supported on alumina and rhenium heptoxide supported on alumina.

It is known that certain olefins, e.g. isobutene, polymerise very readily. For this reason it has not until recently been possible to coreact a mixture of olefins containing an easily polymerisable olefin over a disproportionation catalyst without substantial polymerisation of the feed occurring. Our British Pat. Nos. 1,159,053 and 1,159,054 disclose that the addition of a minor proportion of alkali or alkaline earth metal ions to catalysts comprising molybdenum, tungsten or rhenium carbonyl supported on silica and/or alumina, or molybdena supported on alumina results in a catalyst suitable for use in the co-reaction of an olefin mixture containing an easily polymerisable olefin and does not polymerise the olefin to any great extent.

It is an object of the present invention to provide a process for the preparation of olefins by the reaction of an olefinic mixture containing an easily polymerisable olefin, e.g., isobutene, over a disproportionation catalyst.

We have now discovered that if a rhenium heptoxide on alumina catalyst is prepared in a special manner it is suitable for use as a catalyst for co-reaction of an olefin mixture containing an easily polymerisable olefin and does not polymerise the olefin to any great extent.

Thus according to the present invention there is provided a process for the preparation of olefins which process comprises reacting an initial mixture of an acyclic olefin of formula $R(R_1)C=CR_2(R_3)$, the R substituents representing hydrogen atoms or alkyl or aryl groups, with an easily polymerisable olefin in the presence of a catalyst prepared by heating rhenium heptoxide in a stream of carrier gas whereby the rhenium heptoxide is sublimed onto alumina located downstream of the rhenium heptoxide.

In one embodiment, the rhenium heptoxide is heated to a temperature in the range 150°–700° C., e.g., to about 300° C. in a tube using air as a suitable carrier gas. The alumina is located in the tube downstream from the heptoxide and the temperature of the alumina in this embodiment does not rise above 50° C. When all the rhenium heptoxide has sublimed onto the alumina the product may be activated by fluidising it in a stream of dry air at a temperature of 200°–800° C., preferably 400°–600° C. At the end of the activation the catalyst may be purged with dry nitrogen.

In a further and preferred embodiment of the invention, the rhenium heptoxide is generated in situ by thermally decomposing ammonium perrhenate located in the lower portion of a vertical tube, in an ascending stream of dry air and the rhenium heptoxide formed by the thermal decomposition is volatilised and carried by the ascending air stream into a bed of pre-heated alumina located in an upper portion of the vertical tube, which bed is maintained in a fluidised condition by the ascending air stream. Suitably the alumina is maintained at a temperature between 200°–800° C., preferably 400°–600° C. during the operating cycle.

The finished catalyst suitably contains 0.1–40 parts, preferably 1–20 parts, of rhenium heptoxide per 100 parts alumina.

Before use the catalysts may be subjected to thermal activation, either in a stream of an inert gas such as nitrogen, carbon dioxide or helium, or preferably in a stream of air or oxygen followed by a final treatment in an inert gas. Suitably the catalysts are treated in air at a temperature in the range 300°–900° C. for 1 minute to 20 hours and then under similar conditions with an inert gas such as nitrogen.

Suitable easily polymerisable olefins include tertiary olefins containing the grouping

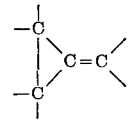

and secondary olefins containing the grouping $$Ar-CH=C<$$

wherein Ar represents an aromatic radical.

The preferred easily polymerisable olefin is isobutene.

A very suitable feedstock for the process is a mixture consisting essentially of butene-2 and isobutene since the reaction products, propylene and 2-methylbutene-2 are very desirable olefins. The uses of propylene are too well-known to require elaboration and 2-methyl-butene-2 on dehydrogenation yields isoprene.

The conditions under which the olefins react may vary with the composition of the feed and the desired products. Reaction temperatures may range from −20° to +500° C., temperatures in the range 20°–100° C. being preferred.

Reaction pressures may be in the range 0–2000 p.s.i.g.

In a continuous process, reaction times may very between 0.01 second and 120 minutes, preferably between 0.1 second and 10 minutes.

In a batch process, suitable olefin/catalyst weight ratios are in the range 1000:1 to 1:1.

If desired, the process may be carried out in the presence of an inert diluent, for example a paraffinic or cycloparaffinic hydrocarbon.

The invention is illustrated by the following examples.

It is to be understood that Examples 1 and 2 are provided for purposes of comparison only and are not in accordance with the present invention.

EXAMPLE 1

A catalyst was prepared by mixing 10.5 g. ammonium perrhenate dissolved in conductivity water with 58.3 g. of a poorly crystalline alumina of surface area 200 m.$^2$/gm., pore volume 0.32 ml./gm. and an average pore diameter of 67 A. The resultant paste was dried at 100° C. The catalyst contained 14% by weight of rhenium heptoxide. It was activated by heating it in air followed by nitrogen at 550° C.

A feedstock containing 6.5% by weight butene-1, 44.8% isobutene and 48.7% butene-2 was then passed over the catalyst at 25° C., 150 p.s.i.g. and a LHSV of 10.

The results are set out in the following table.

EXAMPLE 1

Example 1 was repeated using a different alumina, a poorly crystalline alumina of surface area 350 m.$^2$/gm., pore volume 0.35 ml./gm. and an average pore diameter of 40 A.

The results are set out in the table.

EXAMPLE 3

Into a vertical silica tube 30 cm. long and having an internal diameter of 12 mm. were placed in ascending order, 1 cm. quartz wool, 2.70 g. ammonium perrhenate, 1 cm. quartz wool, 5 cm. silica chips of size 18–30 BSS and 15 g. of the alumina described with reference to Example 1. The alumina had previously been activated at 600° C.

The upper zone of alumina was heated to 550° C. in a stream of dry air sufficient to fluidise the bed. A heating furnace was then lowered to heat the ammonium perrhenate which decomposed to rhenium heptoxide which then volatilised and was carried by the air stream into the fluidised bed of alumina at 550° C. The heating and fluidising was carried on for four hours from the time of lowering the furnace to decompose the perrhenate. The catalyst so prepared contained 14% by weight of rhenium heptoxide.

The feedstock described in Example 1 was then passed over the catalyst under the same reaction conditions.

The results are set out in the table.

EXAMPLE 4

Example 3 was repeated with the difference that the alumina described with reference to Example 2 was employed in the preparation of the catalyst.

The results are set out in the table.

Our British Patent No. 1,116,243 describes and claims a process for the preparation of a rhenium heptoxide catalyst which process comprises heating rhenium heptoxide in a stream of carrier gas whereby it is sublimed onto alumina located downstream of the rhenium heptoxide.

What we claim is:

1. A process for the preparation of propylene and isopentenes which comprises passing a feedstock comprising normal butenes and isobutene, said isobutene being an easily polymerizable olefine subject to substantial polymerization over a diproportionation catalyst, over a catalyst prepared by heating rhenium heptoxide in a stream of carrier gas whereby the rhenium heptoxide is sublimed onto alumina located downstream of the rhenium heptoxide.

2. A process according to claim 1 wherein the rhenium heptoxide is heated to a temperature in the range 150°–700° C. in a tube using air as a carrier gas, the temperature of the alumina not rising above 50° C.

3. A process according to claim 2 wherein when all the rhenium heptoxide has sublimed onto the alumina the catalyst is activated by fluidising it in a stream of dry air at a temperature of 200–800° C.

4. A process according to claim 3 wherein the catalyst is activated at a temperature of 400–600° C.

5. A process according to claim 3 wherein the catalyst is purged with dry nitrogen at the end of the activation.

6. A process according to claim 1 wherein said rhenium heptoxide is generated in situ by thermally decomposing ammonium perrhenate located in the lower position of a vertical tube, in an ascending stream of dry air and the rhenium heptoxide formed by the thermal decomposition is volatilised and carried by the ascending air stream into a bed of pre-heated alumina located in an upper portion of the vertical tube, which bed is maintained in a fluidised condition by the ascending air stream.

7. A process according to claim 6 wherein the alumina is maintained at a temperature between 200° and 800° C. during the operating cycle.

8. A process according to claim 7 wherein the alumina is maintained at a temperature of between 400° and 600° C.

9. A process according to claim 1 wherein the finished catalyst contains 0.1 to 40 parts by weight of rhenium heptoxide per 100 parts by weight of alumina.

10. A process according to claim 9 wherein the finished catalyst contains 1 to 20 parts by weight of rhenium heptoxide per 100 parts by weight of alumina.

11. A process according to claim 1 wherein the catalyst is subjected before use to thermal activation, either in a stream of inert gas such as nitrogen or in a stream of air or oxygen followed by a final treatment in an inert gas.

12. A process according to claim 11 wherein the catalysts are treated in air at a temperature in the range

TABLE

| Example No. | Catalyst | Products g./100 g. feed passed | | | | | | | |
|---|---|---|---|---|---|---|---|---|---|
| | | $C_2H_4$ | $C_3H_6$ | $C_4H_1$-1 | $i$-$C_4H_8$ | $C_4H_8$-2 | $n$-$C_5H_{10}$ | $i$-$C_5H_{10}$ | $>C_5$* |
| 1 | $Re_2O_7$ "A" $Al_2O_3$ | Trace | Trace | 5.9 | 13.9 | 47.9 | Trace | Trace | 32.3 |
| 2 | $Re_2O_7$ "B" $Al_2O_3$ | Trace | Trace | 5.7 | 11.3 | 48.2 | Trace | Trace | 34.8 |
| 3 | $Re_2O_7$ "A" $Al_2O_3$ | 0.3 | 15.5 | 1.3 | 22.6 | 32.1 | 4.6 | 17.0 | 6.7 |
| | $Re_2O_7$ "B" $Al_2O_3$ | 0.2 | 12.0 | 1.3 | 25.5 | 35.6 | 4.3 | 14.3 | 6.7 |

*Largely $C_4$ oligomers.

Examples 1 and 2 show that "impregnated" catalyst extensively polymerised the feed, and in particular isobutene, to the exclusion of co-reaction of the olefins. By contrast, Examples 3 and 4 show that "sublimed" catalysts caused relatively little polymerisation and promoted a considerable amount of co-reaction.

300°–900° C. for 1 minute to 20 hours and then under similar conditions with an inert gas such as nitrogen.

13. A process according to claim 1 wherein the feedstock is a mixture of butene-2 and isobutene.

14. A process according to claim 1 wherein the reaction temperature is in the range −20° to +500° C.

15. A process according to claim 14 wherein the reaction temperature is in the range 20° to 100° C.

16. A process according to claim 1 wherein the reaction pressure is in the range 0 to 2000 p.s.i.g.

17. A process according to claim 1 wherein the process is continuous having a reaction time of between 0.01 second and 120 minutes.

18. A process according to claim 17 wherein the reaction time is between 0.1 second and 10 minutes.

19. A process according to claim 1 wherein the process is a batch process and the olefin/catalyst weight ratios are in the range 1000:1 to 1:1.

20. A process according to claim 1 wherein the process is carried out in the presence of an inert diluent such as a paraffinic or cyclo-paraffinic hydrocarbon.

21. A process according to claim 2 wherein said temperature is about 300° C.

References Cited

UNITED STATES PATENTS

| | | | |
|---|---|---|---|
| 3,261,879 | 7/1966 | Banks | 260—683 |
| 3,424,812 | 1/1969 | Howman et al. | 260—683 |
| 3,526,676 | 9/1970 | Turner et al. | 260—683 |

DELBERT E. GANTZ, Primary Examiner

C. E. SPRESSET, JR., Assistant Examiner

U.S. Cl. X.R.

260—668, 677

PO-1050
(5/69)

UNITED STATES PATENT OFFICE
CERTIFICATE OF CORRECTION

Patent No. 3,637,890                    Dated January 25, 1972

Inventor(s) Brian Patrick McGrath et al.

It is certified that error appears in the above-identified patent and that said Letters Patent are hereby corrected as shown below:

Column 3, line 23, change "EXAMPLE 1" to --EXAMPLE 2--.

Column 3, in the table, line 3 thereof, change "$C_4H_1-1$" to --$C_4H_8-1$--.

Signed and sealed this 14th day of November 1972.

(SEAL)
Attest:

EDWARD M. FLETCHER, JR.                    ROBERT GOTTSCHALK
Attesting Officer                          Commissioner of Patents